June 2, 1953 J. C. SPINDLER 2,640,933

DUAL RANGE ANTENNA

Filed Dec. 12, 1950

INVENTOR.
JOSEPH C. SPINDLER
BY Francis W. Crotty
HIS ATTORNEY

Patented June 2, 1953

2,640,933

UNITED STATES PATENT OFFICE 2,640,933

DUAL RANGE ANTENNA

Joseph C. Spindler, Chicago, Ill., assignor to Zenith Radio Corporation, a corporation of Illinois Application December 12, 1950, Serial No. 200,378

5 Claims. (Cl. 250—33.65)

Figure 1:
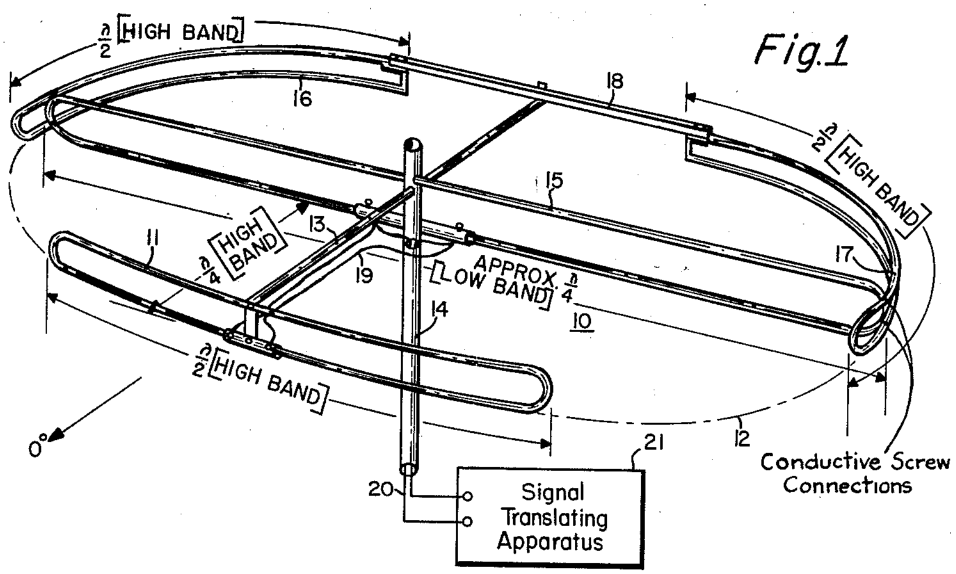

This invention relates to an antenna and more particularly to one that is efficiently operable within two frequency ranges spaced from one another in the frequency spectrum such as those assigned to television service.

As presently established by the Federal Communications Commission, those portions of the frequency spectrum which are assigned to television service lie in the ranges of 54 to 88 mgs. and 174 to 217 mgs. Receivers, adapted to reproduce images in response to television signals, employ some form of antenna to intercept signals within these ranges. Since the efficiency of an antenna is related to its effective electrical length, the construction of an antenna which is to operate with acceptable efficiency over each of the two ranges of television frequencies presents a problem of no small proportions, particularly since the two ranges are not harmonically related to one another.

One prior antenna arrangement utilized for television reception includes a pair of folded dipole antenna elements disposed in a horizontal plane and spaced from one another by a distance substantially equal to one-quarter wave length at the center frequency of the higher one of the television frequency ranges. Moreover, each dipole has an effective electrical length of substantially one-half wave length at the center frequency of one of the ranges. The field pattern of this antenna in the lower range is a figure eight having maximum values disposed along a line transverse of the longer of the dipoles and presenting deep nulls in a direction along the line of the antenna. The field pattern for frequencies in the high band is essentially unidirectional because the shorter of the two dipoles functions as the principal radiating element while the other dipole serves as a reflector therefor. In addition, the field pattern in the high band exhibits deep nulls in directions along the line of the antenna.

In certain applications, the directivity of the afore-described arrangement may be objectionable, as for example, if signals from widely different directions are to be received. Furthermore, the sharp forward lobe makes orientation very critical and hence mounting of the antenna is much more difficult than if the forward lobe were broader.

It is therefore an object of this invention to provide an improved antenna which is not as highly directive as the afore-described prior arrangement and yet approaches the efficiency thereof.

It is a further object of the invention to provide a novel antenna which is efficiently operable over two frequency ranges in the frequency spectrum which are not harmonically related to one another.

It is still another object of the invention to provide a multi-band antenna which is essentially geometrically balanced and is more compact than prior arrangements.

In accordance with the invention, an antenna operable within two frequency ranges spaced from one another in the frequency spectrum comprises a first dipole having an effective electrical length of substantially one-half wave length at the center frequency of the higher one of the frequency ranges. The antenna also includes a second dipole having an effective electrical length less than one-half wave length at the center frequency of the lower one of the frequency ranges, electrically connected to and disposed essentially parallel to the first dipole and effectively spaced therefrom by a distance substantially equal to one-quarter wave length at the center frequency of the higher one of the frequency ranges. The antenna further includes a pair of end-loading elements, each electrically connected to one extremity of the second dipole and extending therefrom in a general direction away from the first dipole and toward the other of the loading elements. These elements have lengths to constitute together with the second dipole a resonant antenna element at the center frequency of the lower one of the frequency ranges and operate as reflector elements for the first dipole. Means are provided for coupling the dipoles with a signal-translating apparatus.

Figure 2:
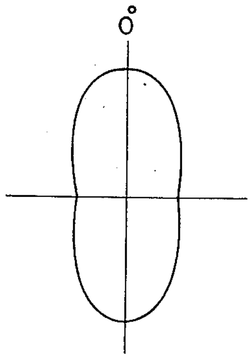
Figure 3:
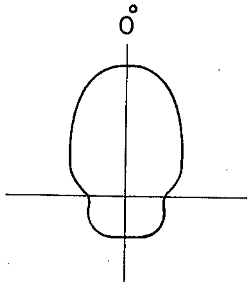

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Fig. 1 is an oblique view of an antenna structure in accordance with the invention; and, Figs. 2 and 3 illustrate by polar diagrams a horizontal cross section of the field pattern of the antenna structure of Fig. 1.

Referring now to Fig. 1, the antenna 10 there represented is operable within two frequency ranges spaced from one another in the frequency spectrum and includes a first folded dipole 11 of arcuate configuration defining a segment of an imaginary ellipse 12 indicated in dash-dot outline. The minor axis of this ellipse falls in a plane bisecting dipole 11 and its length is substantially equal to one-half wave length at the center frequency of the higher one of the frequency ranges in which the antenna is operable. Dipole 11 likewise has an effective length of one-half wave length of this same center frequency and the center of its upper conductor is mechanically connected to one end of a conductive rod 13 which, in turn, passes through and is supported at its center at the top of a vertical, hollow mast 14. The lower conductor of dipole 11 is also mechanically connected to rod 13, but is electrically insulated therefrom.

A second folded dipole 15, having an effective electrical length less than one-half wave length at the center frequency of the lower one of the intended operating frequency ranges, is disposed in the plane of the major axis of ellipse 12, essentially parallel to dipole 11, and spaced therefrom by a distance approximately equal to one-quarter wave length at the center frequency of the higher one of the operating frequency ranges. Dipole 15 preferably has a length approximately equal to one-quarter wave length at the center frequency of the lower one of the frequency ranges and its upper conductor is mechanically connected to the top of mast 14. The lower conductor of dipole 15 is also mechanically connected to mast 14, but is electrically insulated therefrom.

A pair of similar end-loading elements 16 and 17 of arcuate configuration are provided for dipole 15 and may be constructed of a conductive sheet material, but preferably are closed conductive loops which have a general appearance like that of dipole 11. Each of these elements is physically and electrically connected near one end to one extremity of dipole 15, for example by individual screws which secure the conductors of antenna element 15 to the conductors of a loading element. Elements 16 and 17 extend from dipole 15 is a general direction away from dipole 11 and toward one another, being symmetrically disposed relative to the minor axis of ellipse 12 to define individual segments of the ellipse. The free ends of elements 16 and 17 are physically connected to the extremities of a rod 18 of electrically insulating material which maintains the loading elements coplanar with the dipoles. The support rod is affixed at its center to support 13 and, if desired, rod 18 may be preformed to carry out the elliptical configuration and enhance the overall appearance of the antenna structure. The lengths of end-loading elements 16 and 17 are chosen so that the loading they contribute to dipole 15 causes the dipole to resonate at the center frequency of the lower one of the frequency ranges. Each loading element preferably has a length approximately equal to one-half wave length at the center frequency of the high band. Since elements 16 and 17 are disposed behind dipole 11, they also function as reflector elements therefor.

A parallel-wire transmission line 19 extends between the terminals of dipoles 11 and 15 and another parallel-wire transmission line 20 fed through the hollow mast 14 is connected between the terminals of dipole 15 and a signal-translating apparatus 21. The feeders 19 and 20 constitute means for coupling each of dipoles 11 and 15 with the signal-translating apparatus and their surge impedance matches the input impedances of dipoles 11 and 15. The details of such impedance matching are generally well understood and a discussion thereof is deemed unnecessary.

In a particular example of a television antenna constructed in accordance with the invention, the following dimensions (in inches) were employed.

| | |
|---|---|
| Dipole 11 | 27¾ |
| Dipole 15 | 57 |
| End loading element 16 | 33 |
| End loading element 17 | 33 |
| The distance from dipole 11 to dipole 15 | 14¼ |
| The distance from dipole 15 to rod 18 | 14 |
| The distance between elements 16 and 17 along rod 18 | 18 |

For convenience of explanation, the antenna of Fig. 1 will be treated as if utilized for radiating signals. This is a proper expedient inasmuch as the electrical characteristics of an antenna are the same for transmitting as for receiving signals.

Considering first the operation of antenna 10 at the center frequency of the lower frequency range, signals from apparatus 21 are supplied through feeder 20 to dipole 15. Although dipole 15 per se has a length of less than one-half wave length for these signals, the loading effect of elements 16 and 17 resonates the dipole at this center frequency. The effect of dipole 11 is negligible at this frequency. The radiation pattern for the composite antenna 10 for the described operating conditions is illustrated in Fig. 2 and is approximately a "figure eight," but with broader lobes and without the sharp nulls in the directions along the antenna which are characteristic of prior-art duo-dipole arrangements. If elements 16 and 17, are removed, antenna 15 becomes an inefficient low band radiator having a gain of approximately 10 decibels less than that of the end-loaded arrangement and has its radiation pattern revert to a sharp nulled figure eight.

When the antenna operates at the center frequency of the higher frequency range, signals from translator 21 are supplied through feeders 19 and 20 to dipole 11. Dipole 15 and end-loading elements 16 and 17 function substantially as reflector elements for dipole 11 with some additional radiation due to energy directly fed via feeder 20 and the field pattern illustrated in Fig. 3 is obtained. It will be observed that no sharp lobes or nulls exist in the pattern and although some directivity does exist in the forward direction, the antenna is operable in essentially all directions. It has been determined experimentally that without end-loading elements 16 and 17, the signal strength of the antenna when operating in the high band is several decibels below that of the end-loaded arrangement, a rather narrow lobe is exhibited in the forward direction and deep nulls exist along the line of the antenna. Consequently, it may be seen that end-loading elements 16 and 17 advantageously affect operation of the antenna system on the high band.

The invention affords a dual-range wide-band antenna which operates efficiently over two ranges in the frequency spectrum that are not harmonically related to one another. Furthermore, since the maximum dimension of the antenna is substantially less than one-half wave length at the center frequency of the low band, it is much more compact and lighter than prior arrangements. Moreover, since the antenna has the general configuration of an ellipse, with dipole element 15 disposed along the major axis thereof, a geometrically balanced and symmetrical structure is effected. Consequently, mounting of the antenna is more easily accomplished than with prior arrangements.

From an inspection of Figs. 2 and 3 it may be seen that the antenna in accordance with the invention has a field pattern which includes a broad forward lobe in each operating frequency range and hence the antenna is easily oriented. In addition, no sharp nulls appear in the field pattern and the antenna is operable in widely different directions.

It has been determined from actual operation of the antenna that although physically smaller and less directive than prior arrangements, the antenna provides comparable performance with regard to picture quality of a received television signal.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An antenna operable within two frequency ranges spaced from one another in the frequency spectrum comprising: a first dipole having an effective electrical length of substantially one-half wave length at the center frequency of the higher one of said frequency ranges; a second dipole having an effective electrical length less than one-half wave length at the center frequency of the lower one of said frequency ranges, electrically connected to and disposed essentially parallel to said first dipole and effectively spaced therefrom by a distance substantially equal to one-quarter wave length at the center frequency of the higher one of said frequency ranges; a pair of end-loading elements, each electrically connected to one extremity of said second dipole and extending therefrom in a general direction away from said first dipole and toward the other of said elements, having lengths to constitute together with said second dipole a resonant antenna element at the center frequency of the lower one of said frequency ranges and to operate as reflector elements for said first dipole; and means for coupling said dipoles with signal-translating apparatus.

2. An antenna operable within two frequency ranges spaced from one another in the frequency spectrum comprising: a first, folded dipole having an effective electrical length of substantially one-half wave length at the center frequency of the higher one of said frequency ranges; a second, folded dipole having an effective electrical length less than one-half wave length at the center frequency of the lower one of said frequency ranges, electrically connected to and disposed essentially parallel to said first dipole and effectively spaced therefrom by a distance substantially equal to one-quarter wave length at the center frequency of the higher one of said frequency ranges; a pair of end-loading elements, each electrically connected to one extremity of said second dipole and extending therefrom in a general direction away from said first dipole and toward the other of said elements, having lengths to constitute together with said second dipole a resonant antenna element at the center frequency of the lower one of said frequency ranges and to operate as reflector elements for said first dipole; and means for coupling said dipoles with signal-translating apparatus.

3. An antenna operable within two frequency ranges spaced from one another in the frequency spectrum comprising: a first dipole of arcuate configuration having an effective electrical length of substantially one-half wave length at the center frequency of the higher one of said frequency ranges; a second dipole having an effective electrical length less than one-half wave length at the center frequency of the lower one of said frequency ranges, electrically connected to and disposed essentially parallel to said first dipole and effectively spaced therefrom substantially in the direction of the center of curvature of the arc defined by said first dipole by a distance substantially equal to one-quarter wave length at the center frequency of the higher one of said frequency ranges; a pair of end-loading elements of arcuate configuration, each electrically connected to one extremity of said second dipole and extending therefrom in a general direction away from said first dipole and toward the other of said elements, having lengths to constitute together with said second dipole a resonant antenna element at the center frequency of the lower one of said frequency ranges and to operate as reflector elements for said first dipole; and means for coupling said dipoles with signal-translating apparatus.

4. An antenna operable within two frequency ranges spaced from one another in the frequency spectrum comprising: a first dipole of arcuate configuration defining a segment of an ellipse and having an effective electrical length of substantially one-half wave length at the center frequency of the higher one of said frequency ranges; a second dipole having an effective electrical length less than one-half wave length at the center frequency of the lower one of said frequency ranges, electrically connected to and disposed essentially parallel to said first dipole and effectively spaced therefrom substantially in the direction of the center of curvature of the arc defined by said first dipole by a distance substantially equal to one-quarter wave length at the center frequency of the higher one of said frequency ranges; a pair of end-loading elements of arcuate configuration defining individual segments of the aforesaid ellipse, each electrically connected to one extremity of said second dipole and extending therefrom in a general direction away from said first dipole and toward the other of said elements, having lengths to constitute together with said second dipole a resonant antenna element at the center frequency of the lower one of said frequency ranges and to operate as reflector elements for said first dipole; and means for coupling said dipoles with signal-translating apparatus.

5. An antenna operable within two frequency ranges spaced from one another in the frequency spectrum comprising: a first dipole of arcuate configuration defining a segment of an ellipse having a minor axis of a length substantially equal to one-half wave length at the center frequency of the higher one of said frequency ranges, said dipole having an effective electrical length of substantially one-half wave length at the center frequency of the higher one of said frequency ranges; a second dipole having an effective electrical length less than one-half wave length at the center frequency of the lower one of said frequency ranges, electrically connected to said first dipole and disposed along the major axis of the aforesaid ellipse and effectively spaced from said first dipole along a radial of the arc defined by said first dipole by a distance substantially equal to one-quarter wave length at the center frequency of the higher one of said frequency ranges; a pair of end-loading elements of arcuate configuration defining individual segments of the aforesaid ellipse, each electrically connected to one extremity of said second dipole and extending therefrom in a general direction away from said first dipole and toward the other of said elements, having lengths to constitute together with said second dipole a resonant antenna element at the center frequency of the lower one of said frequency ranges and to operate as reflector elements for said first dipole; and means for coupling said dipoles with signal-translating apparatus.

JOSEPH C. SPINDLER.

References Cited in the file of this patent

UNITED STATES PATENTS

| Number | Name | Date |
|---|---|---|
| 2,243,677 | Lindenblad | May 27, 1941 |
| 2,324,462 | Leeds | July 13, 1943 |
| 2,474,480 | Kearse | June 28, 1949 |

OTHER REFERENCES

Electronics, page 100, March 1949.